(No Model.) 2 Sheets—Sheet 2.

F. G. FOWLER.
STEAM BOILER.

No. 583,529. Patented June 1, 1897.

Witnesses
J. B. Fowler.
M. T. Winn.

Inventor
F. G. Fowler

UNITED STATES PATENT OFFICE.

FRANK G. FOWLER, OF BRIDGEPORT, CONNECTICUT.

STEAM-BOILER.

SPECIFICATION forming part of Letters Patent No. 583,529, dated June 1, 1897.

Application filed June 25, 1896. Serial No. 596,954. (No model.)

*To all whom it may concern:*

Be it known that I, FRANK G. FOWLER, a citizen of the United States, and a resident of Bridgeport, Connecticut, have invented a new and useful Improvement Applicable to Steam-Boilers, of which the following is a specification.

In my Patent No. 423,423 I have described a process for removing the gases held in solution from feed-water before it is used to produce steam.

My present invention is an improved apparatus by which that process may be practiced which is entirely automatic in its operation, which is simple and cheap in construction, and economical in working. It will be understood by reference to the annexed drawings, in which—

Figure 1:
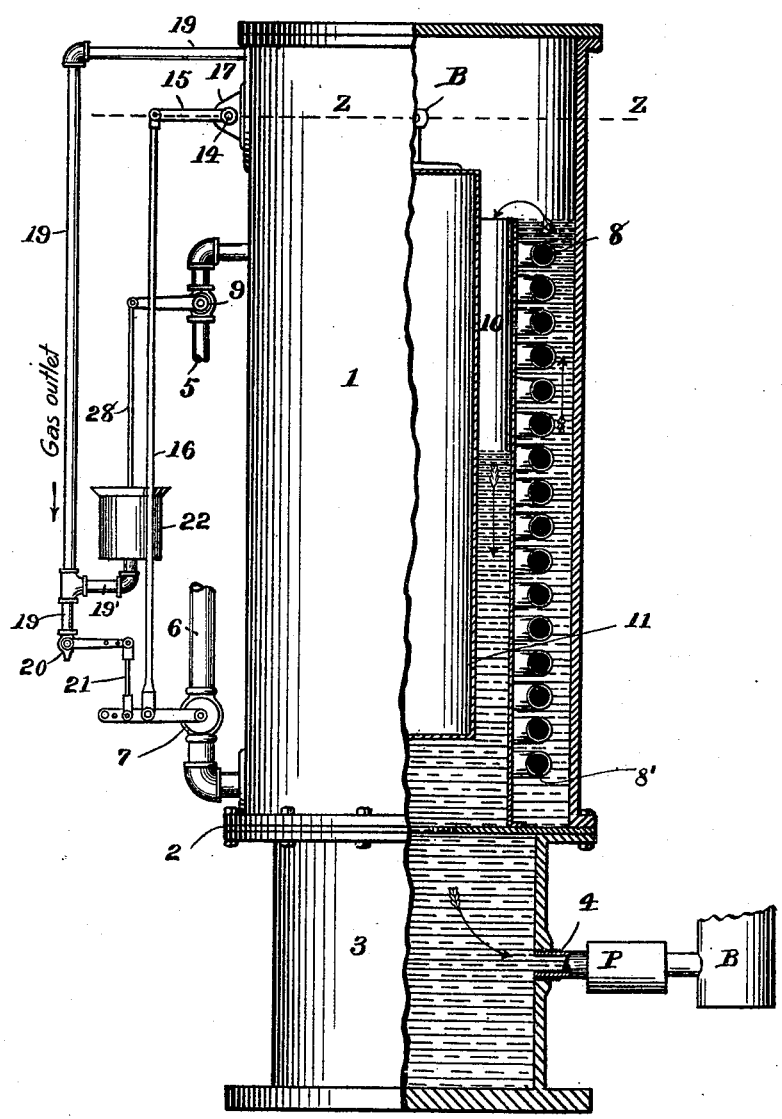
Figure 2:
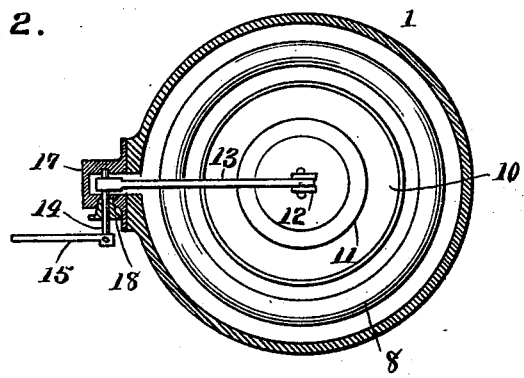
Figure 3:
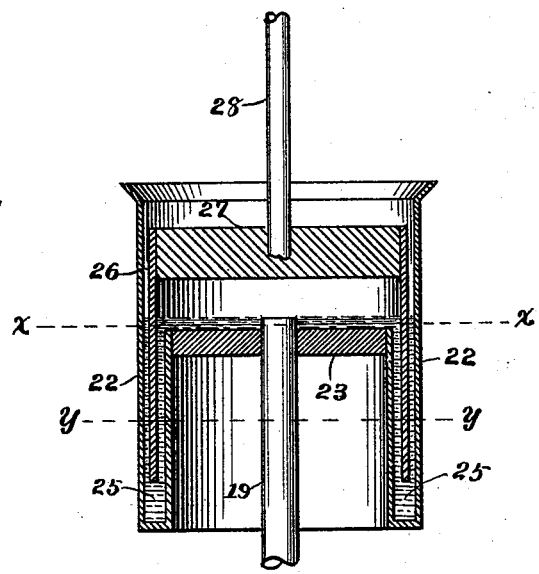
Figure 4:
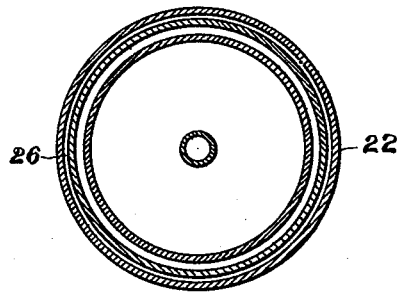

Figure 1 represents a side elevation showing external details and a sectional side elevation showing its internal arrangement. Fig. 2 represents a sectional plan view of Fig. 1, the intersection being at the dotted line $z\ z$. Fig. 3 represents a sectional side elevation of a detail of Fig. 1. Fig. 4 represents a sectional plan view of Fig. 3, the intersection being at the dotted line $y\ y$.

My invention consists of a hollow cylinder or receiving vessel 1, provided at its upper end with a closed head and at its lower end with a sheet-metal head 2, having an aperture in its center. Beneath the receiving vessel 1 is a settling-chamber 3, provided with a pipe attachment which communicates between the settling-chamber and feed-pump, which is represented by diagram P.

6 is a pipe carrying the incoming feed-water and is provided with an automatic valve 7. Within the receiving vessel is arranged a live-steam-heating coil 8, which is closed at its lower end, but provided on its under surface with minute openings 8' one-thirty-second of an inch more or less in diameter and sufficient in number to permit the exit of the water produced by the condensation of the steam with which the coil is filled. The upper end of coil 8 is provided with an automatic valve 9, which regulates the admission of live steam. It is a balanced valve and opens and closes with little friction, yet I do not confine myself to this particular construction, as other easy-working valves will answer the purpose.

Inside of coil 8 is a tube 10, which is open at its upper end and secured at its lower end to the head 2 by a flange. Inside of tube 10 is a float 11, which is about half the specific gravity of water. This float is connected, by mechanism to be explained hereinafter, with the regulating-valve 7, and opens and closes the same whenever the level of the water in which the float is half immersed rises or falls. This mechanism consists of a connecting-rod 12, a lever 13, shaft 14, lever 15, and connecting-rod 16.

17 is a box or cap which also forms a bearing for shaft 14 and is provided with a stuffing-box 18. This cap serves to cover the aperture through which the connecting apparatus passes and serves to make the receiving vessels steam-tight, while all the friction that is produced by an upward and downward motion of the float and the opening and closing of valve 7 is the very slight torsional friction upon shaft 14.

19 is a small pipe communicating with the upper portion of receiving vessel 1. It is provided at its lower end with an automatic valve 20. The handle of this valve is attached by a connecting-rod 21 to the handle of valve 7, whereby valves 7 and 20 will be opened and closed at the same time and in the same ratio.

Valve 9, which regulates the admission of live steam to coil 8, is operated automatically by a special frictionless motor 22, which is shown in detail by Figs. 3 and 4. It consists of retaining-cup having an elevated bottom 23 and hollow leg 25, as clearly shown in Fig. 3. In the center of this bottom and projecting a little above it is the termination of pipe 19', and the leg is filled with mercury up to the dotted line $x\ x$.

26 represents an inverted cup having a solid bottom 27 and adapted to work up and down in the hollow leg 25, as clearly shown in Fig. 3, and is connected by a rod 28 to the handle of valve 9.

The space between the bottom of cup 22 and the bottom of cup 26 becomes, by means of the mercury, an air-tight compartment, which is only accessible through tube 19'. By means of a slight pressure through pipe 19', which will be exerted over the very considerable area presented by the bottom of cup 26, and in consequence of the absence of friction between it and the mercury a very considerable force is made available for closing valve 9, and if this pressure be discontinued the weight of the cup is sufficient to open valve 9. Yet I do not confine myself to this special mechanism for opening and closing valve 9, which admits live steam to the coil, as it is immaterial whether this be accomplished by the means above described or by a plain piston working in a cylinder, so that it will be accomplished by a very low steam or air pressure.

The relative adjustment between the opening and closing of valves 20 and 7 is such that for every gallon of water that passes through valve 7 thirty cubic inches of gases may pass through valve 20, that being the maximum amount of gases that is held in solution in feed-water.

The operation is as follows: Feed-water is admitted to pipe 6 after having passed the heater and live steam is admitted to pipe 5 from the boiler. The apparatus being empty, the weight of float 11 will keep valve 7 open and valve 20 open, and the weight of cup 26 will cause valve 9 to be open, admitting steam to coil 8. As the water enters the receiving vessel it is brought in contact with the coil, and filling the space between tube 10 and the inside wall of receiving vessel 1 it rises upward, being heated more and more, and before reaching the top of tube 10 it is brought to the boiling-point, by which the contained gases are expelled. The water then pours over the end of tube 10 into the inside of it, and passing downward fills the separating-chamber 3 and passes into the feed-pump P, and is forced into the boiler B, which is shown in diagram. As the separating-chamber becomes filled and the level of the water rises to the center of float 11 the float will begin to lift and close valve 7 and keep the water at a uniform level. The gases held in solution in the water, and which are expelled by boiling, will pass out through pipe 19 and valve 20, this valve being adjusted with just sufficient opening to allow the gases to escape.

If the heat in the coil becomes more than sufficient to expel the gases, then a steam-pressure will be generated and steam will escape with the gases through valve 20. As soon as the pressure has arisen to a few ounces it will be communicated to the bottom of cup 26, which, being of large area, will exert a very considerable force, and valve 9 will begin to close, and the amount of steam will be diminished which is admitted to the coil, thus insuring the escape of the gases with only a very small percentage of steam and a very low pressure. The water of condensation inside of the coil passes downward from the steam-pressure and is expelled through the small openings 8' on the under side of the coil and mingles with the feed-water. These openings are very small and somewhat remote from each other, and the water entering at near the boiling-point there is no noise or jar from steam escaping direct into the water.

If the feed-pump be run rapidly, the level of the water in receiving vessel 1 will be lowered and float 11 will descend and valves 7 and 20 will be opened, and if the temperature is diminished so as to decrease the steam-pressure valve 9 will be opened, admitting more steam to the coil and keeping the heat uniform; but if the pump be run slowly the reverse will take place and valves 7, 20, and 9 will be proportionately closed, thus operating automatically whether the pump is run fast or slow.

There is no loss of heat from the steam used in the coil, as all the heat is communicated to the feed-water, which is thereby rendered hotter by whatever amount it receives from the live steam.

I claim as my invention—

1. In an apparatus for preparing feed-water the combination of means consisting of a receiving vessel and a tubular vessel within the same, said receiving vessel connected at its lower end with a water-inlet pipe which is provided with an automatically-operated water-valve, and containing a live-steam coil between said tubular and receiving vessels and connected at its upper end with a live-steam-inlet pipe which is provided with an automatically-operated steam-valve and having at its lower end minute outlet-openings, and containing a float located centrally within the tubular vessel and connected with a water-inlet valve and a gas-outlet valve which are outside of the receiving vessel, and provided with a water-outlet opening connected with a feed-pump, whereby feed-water is deprived of gaseous substances held in solution, automatically, substantially as set forth.

2. In an apparatus for preparing feed-water the combination of means consisting of a receiving vessel and a tubular vessel within the same, said receiving vessel connected at its lower end with a water-inlet pipe which is provided with an automatically-operated water-valve, and containing a live-steam coil between said tubular and receiving vessels and which is connected at its upper end with a live-steam-inlet pipe provided with an automatically-operated steam-valve, and having at its lower end minute outlet-openings, and provided with a water-outlet opening connected with a feed-pump, and containing a float located centrally within the tubular vessel and so connected with the water-inlet valve and the gas-outlet valve as to open and close them by its upward and downward motion and that the ratio of the opening of the gas-outlet valve to the opening of the water-inlet valve may be adjusted to allow of the escape of all the gases which the water admitted by the water-inlet valve will hold in solution and no more, whereby feed-water is deprived of gases held in solution economically and without loss of steam or escape of heat through the gas-outlet valve, substantially as set forth.

3. In an apparatus for preparing feed-water the combination of instrumentalities consisting of a receiving vessel and a tubular vessel within the same, said receiving vessel connected at its lower end with a water-inlet pipe which is provided with an automatically-operated water-valve, and containing a float located centrally within the tubular vessel and connected with a water-inlet valve and a gas-outlet valve, and provided with an outlet-opening connected with a feed-pump, and containing a live-steam coil between said tubular and receiving vessels and provided at its lower end with minute outlet-openings and at its upper end with a live-steam-inlet pipe which is provided with an easy-working steam-valve said valve being connected with a steam-motor which communicates with the receiving vessel and being of sufficient dimensions to close the valve with a slight pressure, whereby feed-water is deprived of its gases held in solution at a temperature slightly exceeding the atmospheric boiling-point and with a minimum expenditure of live steam, substantially as set forth.

4. In an apparatus for preparing feed-water a receiving vessel and a tubular vessel within the same, said receiving vessel connected at its lower end with a water-inlet pipe which is provided with an automatically-operated water-valve, and containing a live-steam coil between said tubular and receiving vessels and which is connected at its upper end with a live-steam-inlet pipe provided with an automatically-operated steam-valve and having at its lower end minute outlet-openings, and having an automatically-operated gas or air outlet valve connected at its upper end, and containing a float located centrally within the tubular vessel connected with the water-inlet valve and gas or air outlet valve by a combination of means consisting of a lever 13, shaft 14 held in position and inclosed by the cap 17 and stuffing-box 18 and consisting further of the connecting-rods 16 and 21 whereby the motion of a float located centrally inside of a steam-tight vessel is communicated to valves outside of the vessel with a minimum of friction, substantially as shown.

5. In an apparatus for preparing feed-water the combination of means consisting of a receiving vessel and a tubular vessel within the same, said receiving vessel connected at its lower end with a water-inlet pipe provided with an automatically-operated water-valve and containing a live-steam coil between said tubular and receiving vessels and connected at its upper end with a steam-inlet pipe provided with a steam-valve which is operated automatically by a motor which derives power from pressure in the receiving vessel, and containing a float located centrally within the tubular vessel and so connected with a water-inlet valve and gas or outlet valve located outside of the receiving vessel as to open and close each by its upward-and-downward motion and provided with a water-outlet opening connected with a feed-pump, whereby feed-water is deprived of gaseous substances held in solution at a very low temperature and with the expenditure of a minimum quantity of heat, substantially as set forth.

FRANK G. FOWLER.

Witnesses:
HOWARD N. WAKEMAN,
JAMES W. THOMPSON.